United States Patent
Loh et al.

(10) Patent No.: US 9,477,605 B2
(45) Date of Patent: Oct. 25, 2016

(54) MEMORY HIERARCHY USING ROW-BASED COMPRESSION

(71) Applicant: Advanced Micro Devices, Inc., Sunnyvale, CA (US)

(72) Inventors: Gabriel H. Loh, Bellevue, WA (US); James M. O'Connor, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 225 days.

(21) Appl. No.: 13/939,377

(22) Filed: Jul. 11, 2013

(65) Prior Publication Data

US 2015/0019813 A1    Jan. 15, 2015

(51) Int. Cl.
*G06F 12/00*    (2006.01)
*G06F 12/08*    (2016.01)

(52) U.S. Cl.
CPC ....... *G06F 12/0866* (2013.01); *G06F 12/0851* (2013.01); *G06F 12/0895* (2013.01); *G06F 2212/1024* (2013.01); *G06F 2212/1036* (2013.01); *G06F 2212/401* (2013.01)

(58) Field of Classification Search
CPC ........... G06F 12/0866; G06F 12/0895; G06F 12/0851; G06F 2212/1024; G06F 2212/1036; G06F 2212/401; G06F 2212/1014
See application file for complete search history.

(56) References Cited

U.S. PATENT DOCUMENTS

| | | | |
|---|---|---|---|
| 5,819,292 A | 10/1998 | Hitz et al. | |
| 7,257,693 B2 * | 8/2007 | Newburn | G06F 12/0802 711/118 |
| 2004/0030847 A1 | 2/2004 | Tremaine | |
| 2005/0268046 A1 * | 12/2005 | Heil | G06F 12/0862 711/137 |
| 2006/0101206 A1 * | 5/2006 | Wood et al. | 711/122 |
| 2008/0256303 A1 * | 10/2008 | Croxford | G06F 12/0886 711/144 |
| 2009/0254705 A1 * | 10/2009 | Abali et al. | 711/117 |
| 2013/0138892 A1 * | 5/2013 | Loh | G06F 12/0864 711/134 |

OTHER PUBLICATIONS

U.S. Appl. No. 13/939,380, filed Jul. 11, 2013, entitled "Memory Hierarchy Using Page-Based Compression".
Alaa R. Almeldeen et al., "Adaptive Cache Compression for High-Performance Processors", Proceedings of the 31st Annual International Symposium on Computer Architecture (ISCA-31), Munich, Germany, Jun. 19-23, 2004, 12 pages.
Final Office Action mailed Oct. 5, 2015 for U.S. Appl. No. 13/939,380, 22 pages.
Advisory Action mailed Jan. 4, 2016 for U.S. Appl. No. 13/939,380, 8 pages.

* cited by examiner

Primary Examiner — Kalpit Parikh

(57) ABSTRACT

A system includes a first memory and a device coupleable to the first memory. The device includes a second memory to cache data from the first memory. The second memory includes a plurality of rows, each row including a corresponding set of compressed data blocks of non-uniform sizes and a corresponding set of tag blocks. Each tag block represents a corresponding compressed data block of the row. The device further includes decompression logic to decompress data blocks accessed from the second memory. The device further includes compression logic to compress data blocks to be stored in the second memory.

20 Claims, 9 Drawing Sheets

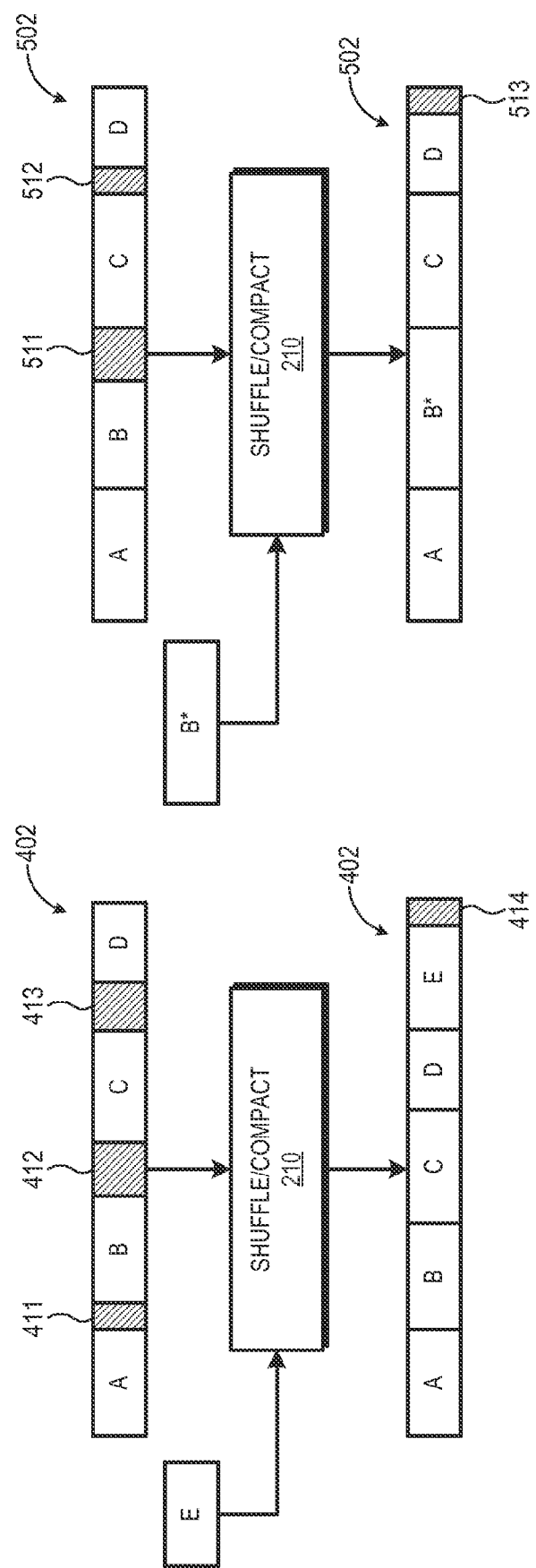

MEMORY HIERARCHY USING ROW-BASED COMPRESSION

GOVERNMENT LICENSE RIGHTS

This invention was made with government support under Prime Contract Number DE-AC52-07NA27344, Subcontract Number B600716 awarded by the Department of Energy (DOE). The Government has certain rights in this invention.

CROSS-REFERENCE TO RELATED APPLICATIONS

The present application is related to co-pending U.S. patent application Ser. No. 13/939,380, entitled "MEMORY HIERARCHY USING PAGE-BASED COMPRESSION" and filed on even date herewith, the entirety of which is incorporated by reference herein.

BACKGROUND

1. Field of the Disclosure

The present disclosure relates generally to processing systems and more particularly to multiple-level memory hierarchies in processing systems.

2. Description of the Related Art

A processing system typically employs a memory hierarchy to store data for use by components of the system. The memory hierarchy includes two or more levels of memory, with the lower-level memories typically being smaller but with faster access, and the higher-level memories being larger but with slower access. As such, a lower-level memory often acts as a cache to temporarily store data from a higher-level memory, thereby allowing requested data to be accessed more quickly when it is present in the cache. However, space and power limitations may limit the size of the cache, which can result in requested data being absent from the cache (that is, a "cache miss"). In such instances, the requested data is then accessed from a slower higher-level memory, which can introduce a performance bottleneck. Moreover, frequent write accesses to higher-level memories can introduce reliability issues as many higher-level memories are implemented using memory architectures that exhibit wear-out as the number of write accesses or program-erase cycles increases.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 4 is a diagram illustrating an example operation of shuffle/compact logic of the control logic of FIG. 2 in accordance with some embodiments.

FIG. 5 is a diagram illustrating another example operation of the shuffle/compact logic of the control logic of FIG. 2 in accordance with some embodiments.

DETAILED DESCRIPTION

Figure 1:
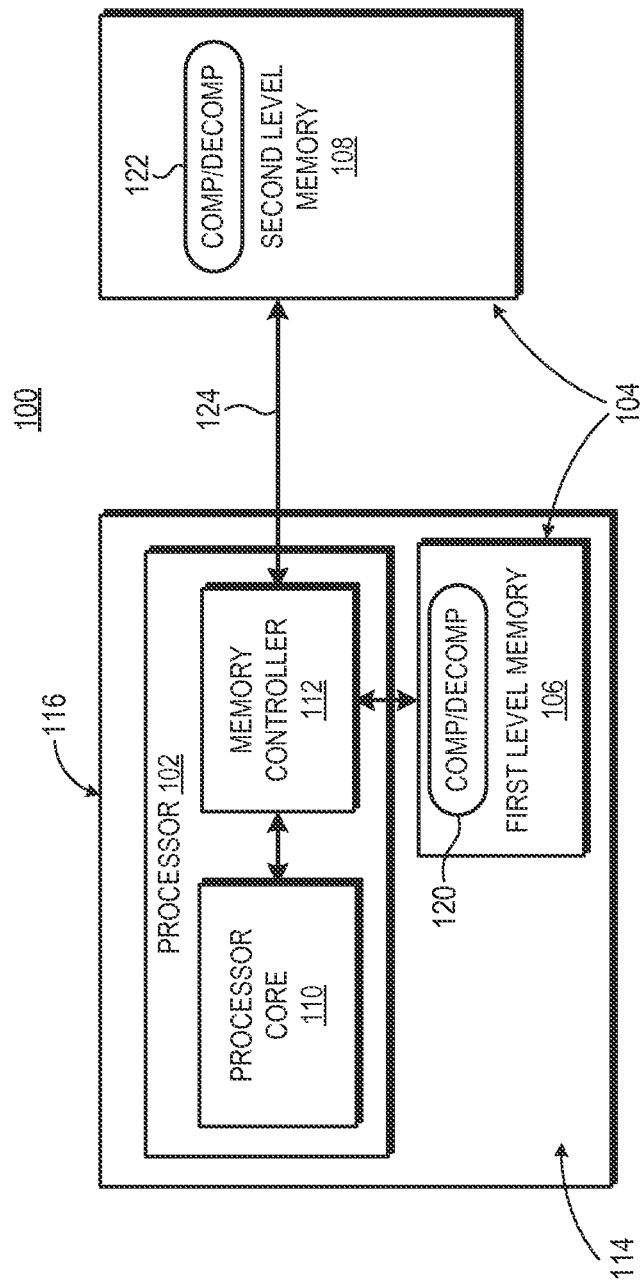
FIG. 1 is a block diagram of a processing system implementing a memory hierarchy with data compression in accordance with some embodiments.

FIGS. 1-10 illustrate example techniques for employing compression in a memory hierarchy of a processing system so as to reduce memory accesses to higher-level memories, and thereby reduce memory performance bottlenecks and uneven wear of higher-level memories. In some embodiments, the memory hierarchy comprises at least two memory levels, whereby at least one lower-level memory employs data compression so as to permit more data to be stored in the lower-level memory, which in turn reduces the number of memory access requests redirected to a higher-level memory. With fewer higher-level memory accesses, the memory hierarchy operates with reduced overall latency. Moreover, a reduction in higher-level memory accesses afforded by the compression of data in lower-level memories can reduce the wear-out of higher-level memories that exhibit limited write endurance.

In some embodiments, the memory hierarchy implements a row-based compression scheme whereby data blocks to be stored in a lower-level memory are compressed before being stored as compressed data blocks at corresponding rows of the lower-level memory. While the data blocks, when uncompressed, may be of uniform size, the particular make-up of each data block typically results in compressed data blocks of non-uniform sizes. This non-uniformity of size inhibits accurate prediction of the location in a row of a particular compressed data block. Thus, in some embodiments, a tag block is generated for each compressed data block and stored in the same physical row as the corresponding compressed data block. In addition to address information and other flag information typically found in tags, each tag block includes a location identifier that permits identification of the location of the compressed data block within the row. In some embodiments, each physical row is limited to a fixed number of tag blocks, and thus a fixed number of compressed data blocks. In other embodiments, the number of tag blocks can vary, thus permitting a variable number of compressed data blocks to be stored in the physical row. Under this approach, data may be tightly packed into the lower-level memory, thus permitting the lower-level memory to service a relatively higher proportion of memory access requests without a cache miss. Moreover, the two accesses needed to access both the tag blocks and the compressed data blocks can be performed relatively quickly because the tag blocks and compressed data blocks are in the same physical row and thus do not require multiple row activations.

In some embodiments, the memory hierarchy employs a page-based compression scheme whereby entire pages of a higher-level memory are stored in compressed form in a lower-level memory. As with individual data blocks, the compressed pages typically have non-uniform sizes. Moreover, the compressed pages may not be stored as contiguous blocks within the lower-level memory. Accordingly, to facilitate identification of the compressed pages stored in the lower-level memory, as well as to identify the location of particular compressed data blocks of a given compressed page within the lower-level memory, the lower-level memory stores a page descriptor table, which includes a page descriptor for each compressed page in the lower-level memory. The page descriptor for a given compressed page includes tag information, status or flag information, and a set of block entries, each block entry associated with a corresponding compressed block of the page and having a pointer or other location identifier that identifies the location of the compressed block within the lower-level memory.

FIG. 1 illustrates a processing system 100 in accordance with some embodiments. The processing system 100 can comprise any of a variety of computing systems, including a notebook or tablet computer, a desktop computer, a server, a network router, switch, or hub, a computing-enabled cellular phone, a personal digital assistant, and the like. In the depicted example, the processing system 100 includes a processor device 102 and a memory hierarchy 104. The processing system 100 also can include a variety of other components not illustrated in FIG. 1, such as one or more display components, storage devices, input/output devices (e.g., a mouse or keyboard), and the like.

The memory hierarchy 104 comprises a plurality of memories, with each memory being described herein as a "level" of memory or "memory level". A memory level that is used to attempt to satisfy a memory access request before another memory level is referred to herein as a "lower-level" memory relative to the other memory level, and the other memory thus is referred to herein as a "higher-level" memory level relative to the lower-level memory. Although the techniques described herein can be readily utilized in an implementation of the memory hierarchy 104 that comprises more than two memory levels using the teachings provided herein, for ease of illustration an example implementation of the memory hierarchy 104 with two memory levels is described. In this implementation, the memory hierarchy 104 includes a first level memory 106 and a second level memory 108 (also referred to herein as a "lower-level memory" and a "higher-level memory"). The second level memory 108 may be implemented as, for example, system, or "main", memory, and the first level memory 106 may be utilized as, for example, a cache to store a subset of the data stored in system memory. To this end, the first level memory 106 may be implemented using, for example, a volatile random access memory that provides higher-bandwidth, lower-power, and lower-latency memory access, such as dynamic random access memory (DRAM) or static random access memory (SRAM). The second level memory 108 may be implemented using, for example, a non-volatile memory that provides greater capacity at the cost of increased access latency, such as such as flash memory, ferroelectric RAM (F-RAM), magnetoresistive RAM, phase-change memory (PCM), spin-torque-transfer magnetic memory (STT-MRAM), resistive RAM (ReRAM), and the like. In other embodiments, the second level memory 108 can implement a volatile memory architecture or the first level memory 106 may implement a non-volatile memory architecture.

The processor device 102 includes one or more processor cores 110 and a memory controller 112 coupleable to the first level memory 106 and the second level memory 108. The one or more processor cores 110 can include, for example central processing unit (CPU) cores, graphics processing unit (GPU) cores, digital signal processing (DSP) cores, or combinations thereof. The memory controller 112 comprises logic and other circuitry to access or otherwise control memories in the memory hierarchy 104. Although FIG. 1 illustrates an example implementation with a single memory controller 112 to control both the first level memory 106 and the second level memory 108, in other embodiments, multiple memory controllers 112 may be implemented. For example, the processor device 102 may implement a cache controller to control the first level memory 106 as a cache, and a northbridge or other separate memory controller to control the second level memory 108 as a system memory.

In some embodiments, one or more lower-level memories are implemented "in-package," whereas one or more higher-level memories are implemented as external devices. FIG. 1 depicts an example of this, whereby the processor device 102 and the first level memory 106 are implemented on the same interposer, die, or other substrate 114 of an integrated circuit (IC) package 116, whereas the second level memory 108 is implemented as one or more modules or devices external to the IC package 116. For example, the first level memory 106 may be implemented as stacked-die memory configured in a side-stacked relationship or vertically-stacked relationship with the processor device 102. Under this approach, the first level memory 106, due to its proximity signaling-wise, can be rapidly accessed by the processor device 102 and the second level memory 108 can implement a relatively large capacity due to it being external to the IC package 116 and thus not limited by the dimensional, power, and thermal requirements that may be imposed on the IC package 116. Moreover, this approach facilitates implementation of different memory architectures that require different manufacturing processes within the memory hierarchy 104.

As noted above, one purpose of a memory hierarchy is to permit data likely to be needed by a data consumer (e.g., the processor device 102) to be temporarily stored "closer" to the data consumer in a lower-level memory that has relatively low capacity but provides lower access latency, while also enjoying the benefit of a higher-level memory that provides relatively high capacity at the expense of higher access latency. In some embodiments, the processing system 100 leverages the lower-level memory (e.g., first level memory 106) by utilizing compression/decompression logic 120 to compress data cached or otherwise stored at the lower-level memory, thereby allowing the lower-level memory to store more data than it could otherwise. As more data can be stored in the lower-level memory due to this compression, the lower-level memory can successfully serve a larger fraction of memory accesses, and thus reduce the number of cache misses that would require a following access to a higher-level memory. As illustrated, the compression/decompression logic 120 may be implemented at the first level memory 106, while in other implementations the compression/decompression logic 120 may be implemented at the memory controller 112 or at a combination of the first level memory 106 and the memory controller 112.

Typically, the individual segments of data to be compressed before storage in the first level memory 106 are of a fixed or uniform size. This uniform size may correlate to a typical cache line or memory row configuration. To illustrate, assuming, for example, the first level memory 106 comprises a DRAM with a 2 kilobyte (KB) row buffer that is divided into thirty-two 64 byte blocks, each uncompressed data segment may be a 64 byte segment. However, depending on the compression technique employed and the makeup of the data within each data segment, the resulting compressed data segments may be of different, or non-uniform, sizes. This non-uniformity of size can make it difficult to subsequently locate a compressed data segment within the first level memory 106. Accordingly, in some embodiments, the memory hierarchy 104 employs location identifiers that are stored in the first level memory 106 along with the compressed data segments. Each location identifier represents a location of the corresponding compressed data segment in some way. In some embodiments, the location identifier comprises a pointer that points directly to a location of the corresponding compressed data segment. In other embodiments, the location identifier comprises a size indicator, and thus the location of the corresponding compressed data segment is identified indirectly via an offset calculated through a summation or accumulation of size indicators for one or more other compressed data segments.

As described below, the memory hierarchy 104 can implement one or both of two compression schemes. One scheme, illustrated in greater detail below with reference to FIGS. 2 and 3, involves compression of individual blocks of data and the storage of the resulting compressed data blocks in rows of the first level memory 106 along with tag blocks corresponding to the compressed data blocks in the same physical row, where each tag block includes a location identifier and other information for the corresponding compressed data block. For ease of identification, this scheme is referred to herein as a "row-based compression scheme". The other scheme, illustrated in greater detail below with reference to FIGS. 5 and 6, involves the storage of entire pages of the second level memory 108 as compressed pages in the first level memory 106, along with page descriptors corresponding to the compressed pages. Each page descriptor includes identifying information for the corresponding compressed page, as well as one or more location identifiers for the one or more compressed data blocks comprising the compressed page. For ease of identification, this scheme is referred to herein as a "page-based compression scheme."

In some embodiments, the second level memory 108 also may employ compression/decompression logic 122 to facilitate efficient transfer of data between the first level memory 106 and the second level memory 108. To illustrate, a data block to be cached in the first level memory 106 may be compressed by the compression/decompression logic 122 at the second level memory 108 before its transfer to the memory controller 112 via an interconnect 124, thereby reducing the amount of bandwidth of the interconnect 124 that needs to be allocated to performing the transfer of the data block. As the compressed data block is already compressed upon its receipt at the memory controller 112, the memory controller 112 can directly store the compressed data block in the first level memory 106. Conversely, when a compressed data block is to be evicted from the first level memory 106 and stored to the second level memory 108, rather than decompressing the compressed data block before this transfer, the memory controller 112 can maintain the data block in compressed form for its transfer over the interconnect 124, thereby reducing the bandwidth allocation for the transfer of the compressed data block from the first level memory 106 to the second level memory 108. Upon its receipt, the compression/decompression logic 122 of the second level memory 108 can decompress the data block before it is stored at the second level memory 108. In other embodiments, the data blocks may be maintained in compressed form while stored at the second level memory 108, although this approach may require that an operating system (OS) executing at the processor device 102 be capable of handling the variable-sized memory blocks that would result from this approach.

Figure 2:
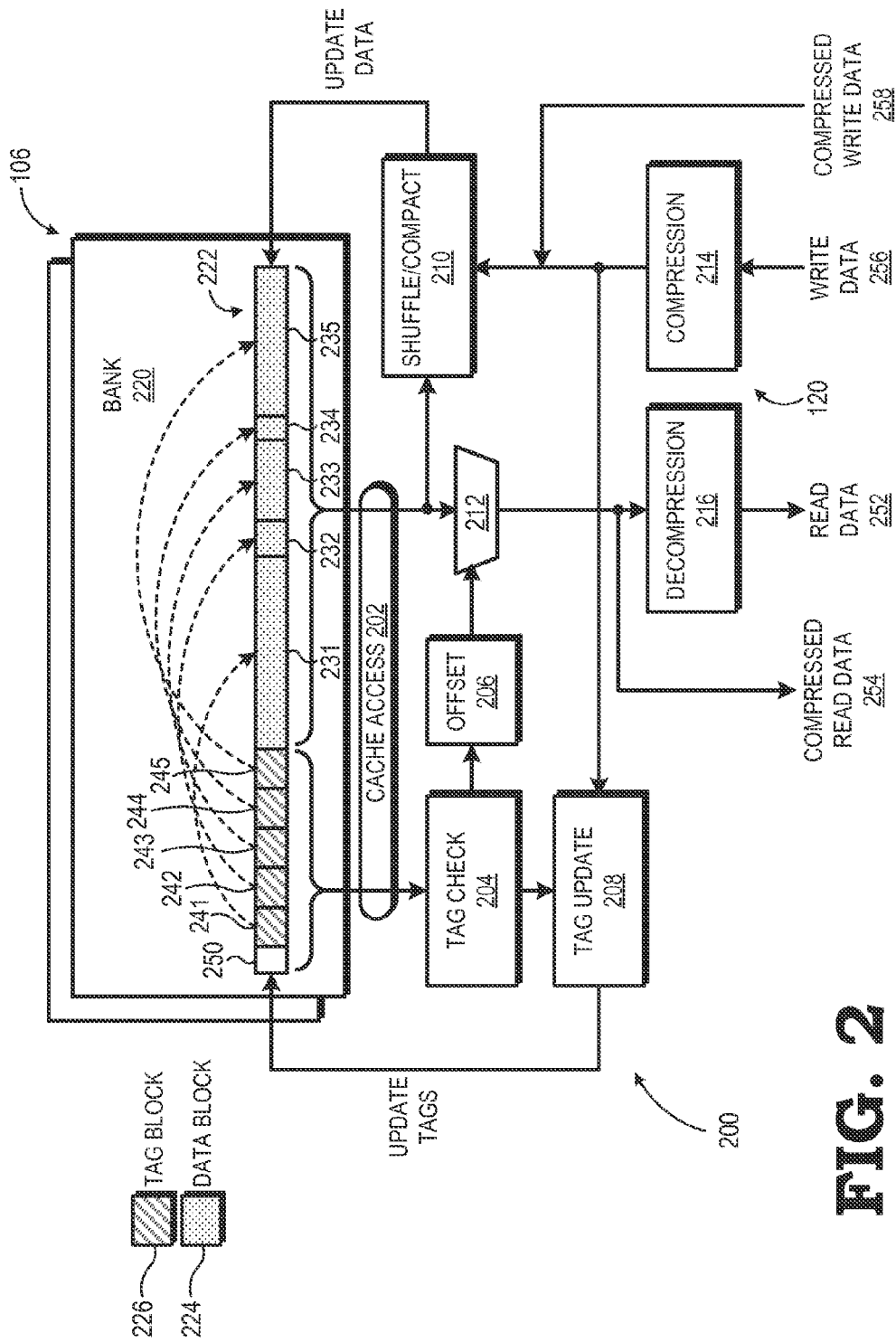
FIG. 2 is a block diagram of control logic of a lower-level memory of a memory hierarchy employing compression in accordance with some embodiments.

FIG. 2 illustrates an example configuration of cache control logic 200 employed by the memory controller 112 of the processing system of FIG. 1 for implementing a row-based compression scheme for data in the first level memory 106 in accordance with some embodiments. In the depicted example, the cache control logic 200 comprises cache access logic 202, tag check logic 204, offset logic 206, tag update logic 208, shuffle/compact logic 210, and a multiplexer 212. Further, the compression/decompression logic 120 (FIG. 1) comprises compression logic 214 and decompression logic 216.

As consistent with DRAM, SRAM and other volatile memory architectures typically used for caches, the first level memory 106 can be organized as a set of banks 220, with each bank 220 comprising a set of rows 222 (only one of which is depicted in FIG. 2 for ease of illustration). In conventional cache architectures, the tag array and the data array of the cache are implemented in separate sets of rows of the cache. In contrast, in some embodiments, the cache control logic 200 co-locates the tag information and data of a corresponding cache line in the same row 222. The data of a cache line is represented as a set of one or more data blocks 224, some or all of which may be compressed. The tag information is represented as a set of one or more tag blocks 226, with each tag block 226 representing a corresponding data block 224 in the row 222. In the simple example depicted in FIG. 2, the illustrated row 222 includes five compressed data blocks 231, 232, 233, 234, and 235 (collectively, "compressed data blocks 231-235"), and five corresponding tag blocks 241, 242, 243, 244, and 245 (collectively, "tag blocks 241-245").

Each tag block comprises information pertaining to the corresponding compressed data block. This information can include, for example, an address, or portion thereof, associated with the data of the compressed data block and one or more flags, such as a valid flag and a dirty flag. Because the compression of data blocks typically results in compressed data blocks of non-uniform sizes, the location of a compressed data block within the row 222 cannot be identified beforehand from the structure of the row 222 unless each compressed data block starts at a fixed point within the row 222. Thus, the tag block further includes a location identifier used to identify the particular location of the compressed data block within the row 222. In some embodiments, the location identifier includes a size indicator only, and thus the starting location of the compressed data block within the row 222 is calculated as an offset generated from a summation or accumulation of sizes of other compressed data blocks in front of the compressed data block in the row 222 (as determined from the size indicators in the tag blocks of these other compressed data blocks). In other embodiments, the location identifier can comprise, for example, a column identifier or other pointer, as well as a size indicator, thereby allowing the start column and end column of the compressed data block to be identified solely from its own tag block.

The number of tag blocks 226 in the row 222, and thus the number of compressed data blocks 224 in the row 222, may be fixed or variable. For an implementation using a variable number of tag blocks/data blocks, the row 222 may include a field 250 (e.g., the first few bits of the row 222) that stores a value indicating the number of valid tag blocks 226 present in the row 222. This value permits the cache control logic 200 to identify which portion of the row 222 is tag block information and which portion is data block information. For an implementation using a fixed number of tag blocks (and thus a fixed maximum number of data blocks) per row, the tag block locations may be hardwired as such with respect to the cache control logic 200.

In operation, the cache control logic 200 responds to a memory access request by searching the tag blocks to determine whether the requested data is present in a given row of the first level memory 106. To do this, the cache access logic 202 accesses the tag blocks of a given row 222 and provides them to the tag check logic 204, which then checks the address portions in the tag blocks to determine whether the requested data is in the row 222. When there are a variable number of tag blocks in the row 222, the cache access logic 202 may use the field 250 to identify which portion of the row 222 is to be output to the tag check logic 204 as tag blocks. For the data access, the portion of the row 222 corresponding to the set of compressed data blocks stored in the row 222 is output to the multiplexer 212. Although this approach requires two accesses, one for the tag blocks and one for the data blocks, because the tag blocks and data blocks are stored in the same physical row, additional row activations are not needed and thus the two accesses can be performed in sequence relatively quickly.

The offset logic 206 identifies the location of the compressed data block storing the requested data based on one or more location identifiers in the tag blocks and then controls the multiplexer 212 to select the data at the identified location for output from the multiplexer. In implementations whereby the location identifiers of the tag blocks are size indicators, the offset logic 206 can identify the location based on an offset calculated from a summation of the size indicators of the compressed data blocks in front of the sought-after compressed data block in the row 222. To illustrate, assume that compressed data block 232 stores the requested data. To identify the start location of the compressed data block 232, the offset logic 206 sums the size indicators of the compressed data blocks 231 and 232 (as found in the tag blocks 241 and 242, respectively) to generate a starting offset value. The end location of the compressed data block 232 then is calculated by adding the size indicator for the compressed data block 232 to the starting offset value to arrive at the ending offset value. In other embodiments, each tag block stores the starting offset value and either a size indicator or the ending offset value, from which the offset logic 206 can calculate the location of the compressed data block directly.

If the memory access request is a read request issued by a data consumer of the processor device 102 or represents a modify request whereby the requested data is to be modified and then stored back to the first level memory 106 (e.g., in a read-modify-write operation), the accessed compressed data block typically is to be converted to decompressed form and is thus provided to the decompression logic 216 for decompression into decompressed read data 252, whereupon it may be modified or provided to the data requestor via the memory controller 112. In other instances, the memory access request may represent an eviction or another request to transfer the requested data from the first level memory 106 to the second level memory 108. In configurations where the second level memory 108 implements the compression/decompression logic 122, rather than decompressing the accessed compressed data block, the decompression logic 216 can be bypassed and the accessed compressed data block may be provided to the memory controller 112 for transmission to the second level memory 108 in compressed form as compressed read data 254.

If the memory access request represents a modify request to modify the uncompressed read data 254, or represents a write request with accompanying write data, the resulting modified data or the specified write data (identified in the alternative as write data 256) is provided to the compression logic 214, which compresses the write data 256 using any of a variety of data compression algorithms to generate compressed write data 258. In other embodiments, the write data may be received in compressed form as compressed write data 258 (e.g., when received in compressed form directly from the second level memory 108).

The compressed write data 258 is provided to the shuffle/compact logic 210, which also receives the set of compressed data blocks from the row 222. The shuffle/compact logic 210 operates to insert the compressed write data 258 into the row 222 by shuffling or shifting the locations of compressed data blocks within the row 222. Example operations of the shuffle/compact logic 210 are described below with reference to FIGS. 4 and 5. The row 222 is then updated with the resulting set of compressed data blocks (including the now-inserted compressed write data 258) with the assistance of the cache access logic 202. Concurrently, the tag update logic 208 generates a tag block for the compressed write data 258 (and includes a location identifier for the compressed write data) and updates the other tag blocks of the row 222 to reflect any changed locations of the other compressed data blocks due to the reorganization performed by the shuffle/compact logic 210. The tag portion of the row 222 is then updated with the new tag block and the modified tag blocks.

Figure 3:
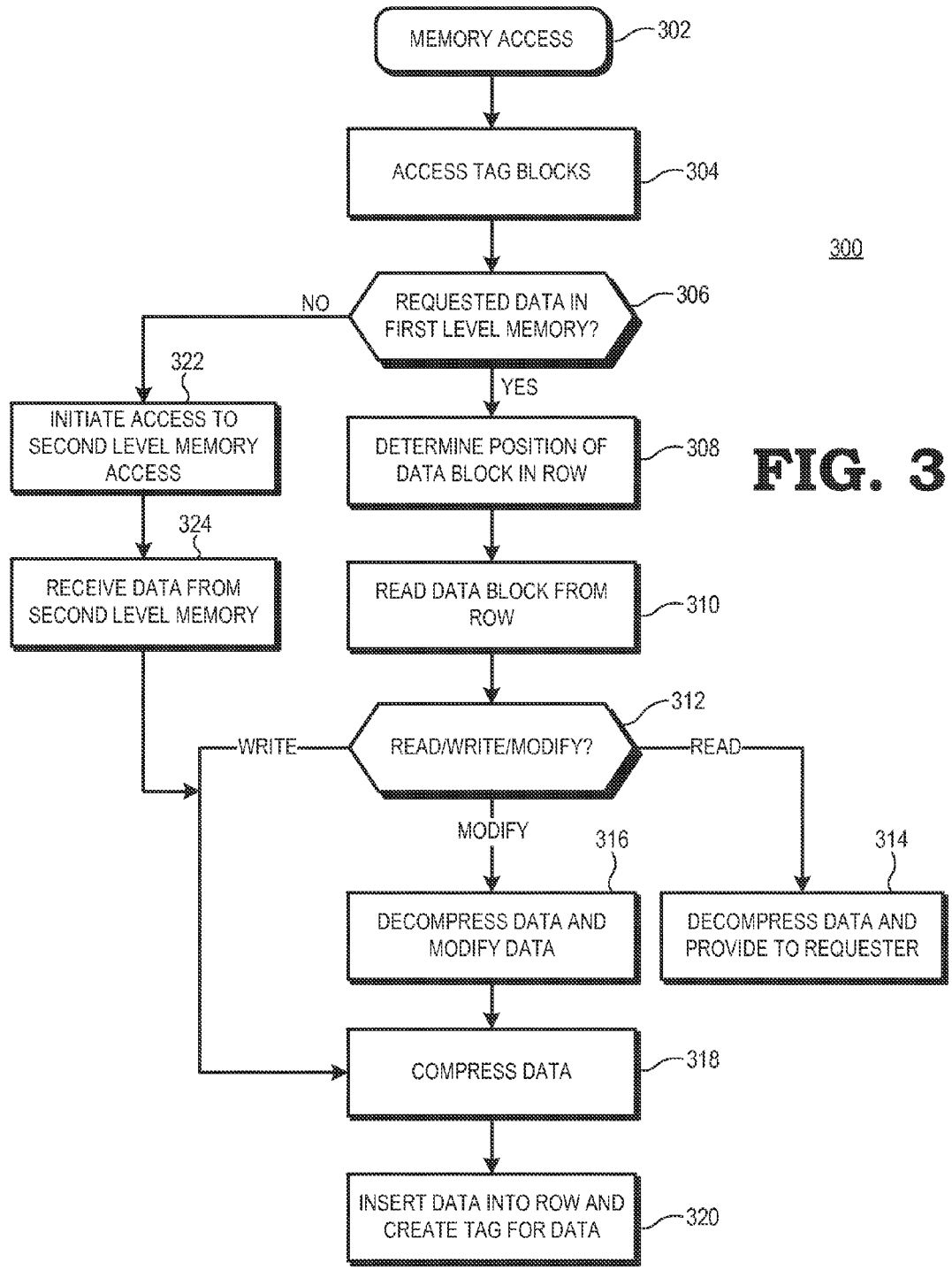
FIG. 3 is a flow diagram illustrating a method for accessing compressed data blocks from a row of a lower-level memory of a memory hierarchy in accordance with some embodiments.

FIG. 3 illustrates an example method 300 for row-based compression in lower-level memory in accordance with some embodiments. For ease of illustration, the method 300 is described in the context of the cache control logic 200 of FIG. 2 as implemented in the processing system 100 of FIG. 1. The method 300 initiates at block 302 with the issuance of a memory access request to the memory controller 112. The memory access request can represent, for example, a read access (either for providing data to a data consumer or for evicting data to a higher-level memory), a write request, or a modify request. In response to the memory access request, the memory controller 112 forward the memory access request to the cache control logic 200. At block 304 the tag check logic 204 accesses the tag blocks of one or more rows 222 of the first level memory 106 to determine whether the requested data is in the corresponding row 222 based on a comparison of an address value of the memory access request and the address values stored in the tag blocks of the row 222.

In the event that the requested data is determined to be present in a row 222 of the first level memory 106 at block 306, at block 308 the offset logic 206 determines the location of the compressed data block storing the requested data from the location identifier of one or more tags in the row 222, as described above. At block 310, the offset logic 206 and the multiplexer 212 use the location determined at block 308 to select and output the sought-after compressed data block from the row 222.

At block 312, the cache control logic 200 determines the memory access type (e.g., read, write, modify) of the memory access request and processes the accessed compressed data block accordingly. In the event that the memory access request is a read access, at block 314 the accessed compressed data block can be decompressed by the decompression logic 216 and the resulting decompressed data block can be provided to the requester or initiator of the memory access request. Alternatively, if the destination of the requested data is the second level memory 108, the decompression process can be bypassed and the accessed data block can be provided in compressed form.

Returning to block 312, if the memory access request is a modify access, at block 316 the accessed compressed data block is decompressed by the decompression logic 216 to generate decompressed data. The decompressed data is then modified in accordance with the modify request to generate modified data to be stored back to the first level memory 106 as write data. At block 318, the compression logic 214 compresses the write data to generate a compressed data block, and at block 320 the compressed data block is stored to a corresponding row 222 of the first level memory 106. This storage process can include, for example, reorganizing the other compressed data blocks in the row 222 to create a contiguous space sufficient to store the compressed data block and creating and storing a tag block for the stored compressed data block, as well as modifying the tag blocks for the other compressed data blocks to reflect any changes in their locations due to the reorganization of the row 222. Returning to block 312, if the memory access request is a write access, the write data accompanying the write access is compressed by the compression logic 214 to generate a compressed data block and the compressed data block and associated tag block are stored in the corresponding row 222 in accordance with blocks 318 and 320 described above.

Returning to block 306, if the tag check logic 204 determines that the requested data is not in the first level memory 106 (i.e., there is a cache miss), at block 322 the memory controller 112 initiates a memory access request to the second level memory 108 to obtain the requested data. The second level memory 108 accesses its memory array to obtain the requested data and provides the requested data to the memory controller 112 as a data block at block 324. The supplied data block is then cached at the first level memory 106 using the same processes described above with respect to a write access.

FIGS. 4 and 5 illustrate example operations of the shuffle/compact logic 210 in accordance with some embodiments. In the example illustrated in FIG. 4, a row 402 (corresponding to row 222 of FIG. 2) of the first level memory 106 initially stores four compressed data blocks, denoted "A", "B", "C", and "D", with unused spaces 411, 412, 413, and 414 interspersed in between. Subsequently, a new compressed data block, denoted "E", is received for storage in the row 402. In response, the shuffle/compact logic 210 identifies the unused spaces 411-414 in the row 402, and shifts the compressed data blocks B, C, and D forward (toward compressed data block A) to generate a contiguous unused space sufficient to store the new compressed data block E (with, in this example, remaining unused space 414). This reorganization also results in updates to the tag blocks (not shown) for compressed data blocks A, B, C, and D to reflect the new locations of the data blocks, as well as the generation and storage of a tag block (not shown) for the compressed data block E. Note that the reorganization also may include reordering data blocks within the row 402.

In the illustrated example of FIG. 5, a row 502 (corresponding to row 222 of FIG. 2) of the first level memory 106 initially stores four compressed data blocks, denoted "A", "B", "C", and "D", with unused spaces 511 and 512 interspersed as shown. Subsequently, the data in compressed data block B is decompressed, modified and then recompressed, resulting in a modified compressed data block, denoted "B*" that is received for storage in the row 402. In this example, the modified compressed data block B* is larger than the original compressed data block B, and thus cannot slot into the same location in the row 502 as originally occupied by the compressed data block B. Accordingly, the shuffle/compact logic 210 identifies the unused spaces 511 and 512 in the row 502, and shifts the compressed data blocks C and D to generate a contiguous unused space between compressed data blocks A and C that is sufficient to store the modified compressed data block B* in place of the compressed data block B (with, in this example, remaining unused space 513). This reorganization also results in updates to the tag blocks (not shown) for compressed data blocks C and D to reflect the new locations of the data blocks, as well as modification to the tag block previously associated with compressed data block B to reflect the status and location of the modified compressed data block B*.

Figure 6:
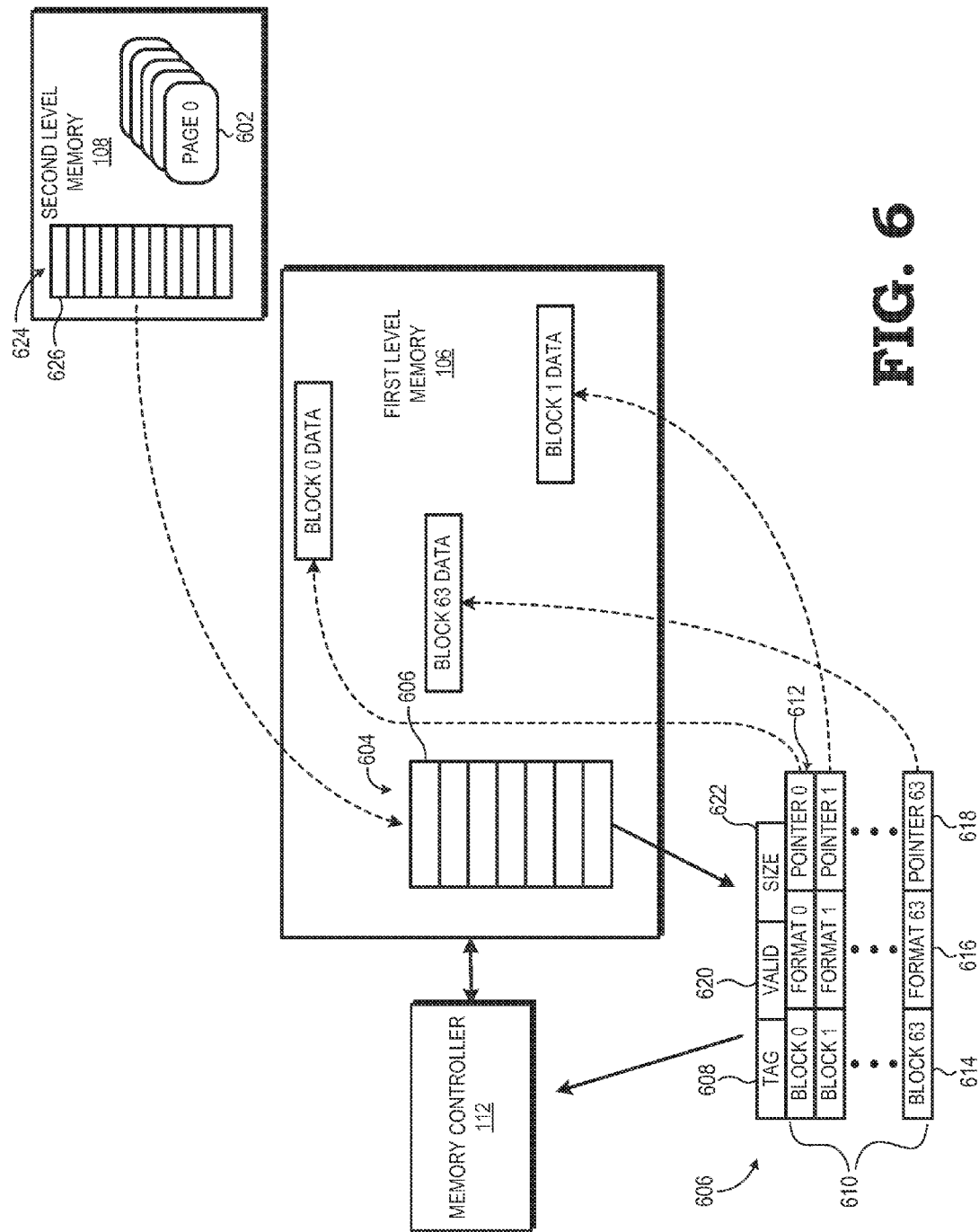
FIG. 6 is a diagram illustrating a lower-level memory of a memory hierarchy employing page-based compression in accordance with some embodiments.

FIG. 6 illustrates an example implementation of the memory controller 112 of the processing system 100 of FIG. 1 for implementing a page-based compression scheme for data in the first level memory 106 in accordance with some embodiments. In many processing systems, the physical address space of the processing system 100 typically is far larger than storage capacity of the system memory (e.g., the second level memory 108). Accordingly, data in secondary storage (e.g., hard disks or network-attached storage) is stored in the system memory in units called "pages," which may be transferred for storage in system memory as a unit, as well as evicted or written back from memory as a unit. Consistent with this approach, the second level memory 108 may store data as a plurality of pages 602. In some embodiments, the memory controller 112 implements a page-based compression scheme whereby a subset of these pages 602 may be stored in their entireties in compressed form in the first level memory 106.

To facilitate identification of the pages so stored, a portion of the first level memory 106 may be used to store a page descriptor table 604 (or other suitable data structure). The page descriptor table 604 includes a plurality of page descriptors 606, with each page descriptor 606 corresponding to a compressed page 602 stored in the first level memory 106. Each page descriptor 606 includes a tag field 608 and a mapping structure 610. The tag field 608 includes an address value or an address range for the corresponding page. The mapping structure 610 maps the data layout of the corresponding page within the first level memory 106. To illustrate, each compressed page may be composed of a set of compressed data blocks, which may be non-contiguously stored in the first level memory 106. Thus, the mapping structure 610 can include a set of block entries 612, with each block entry 612 include a block identifier field 614 to store an address value or other identifier of the corresponding data block (e.g., when the blocks of a page are numbered in increasing or decreasing numerical order), a format field 616 to identify the compression format in which the corresponding data block is stored, such as, for example, a zero value format, a sign-extended format, a run-length encoded format, and the like, and a pointer field 618 to store a pointer to the location of the corresponding data block in the first level memory 106. To illustrate, FIG. 6 depicts an example whereby a compressed page 602 (e.g., page 0) is stored in the first level memory 106 as sixty-four compressed data blocks, and thus the page descriptor 606 in the page descriptor table 604 for the stored compressed page has sixty-four block entries 612, each identifying a corresponding one of the sixty-four compressed data blocks.

To further reduce the total resulting size of a compressed page, when the memory controller 112 is storing the compressed data blocks of a compressed page 602 to the first level memory 106, any compressed data blocks having only zero (0) values are effectively reduced to a size of "zero" by storing a null pointer to the pointer field 618 of the corresponding block entry 612, which serves as a signal to generate a block of zeros as the corresponding data block when accessing and "decompressing" the data block. Each page descriptor 606 can include additional fields, such as a valid field 620 and a size field 622 that stores a value indicating the total compressed size of the corresponding page.

In some embodiments, the second level memory 108 also stores a page descriptor table 624 that is analogous to the page descriptor table 604 maintained in the first level memory 106. However, in this case the page descriptor table 624 can include a page descriptor 626 (analogous to the page descriptor 606) for each page in the second level memory 108, while the page descriptor table 604 maintains page descriptors 606 for only the subset of pages stored in the first level memory 106. As such, a tag field and valid field are unnecessary for the page descriptors 626 in the page descriptor table 624 because every page in memory is represented. In such implementations, a memory access request typically initiates with a search of the page descriptor table 604 of the first level memory 106. If the memory access request hits on the page descriptor table 604, the memory access request is serviced by the first level memory 106 using the compressed version of the page contained the requested data stored therein. If the memory access request misses on the page descriptor table 604, the memory controller 112 redirects the memory access request to the second level memory 108 by accessing the page descriptor table 624 to identify the location of the data block storing the requested data.

Figure 7:
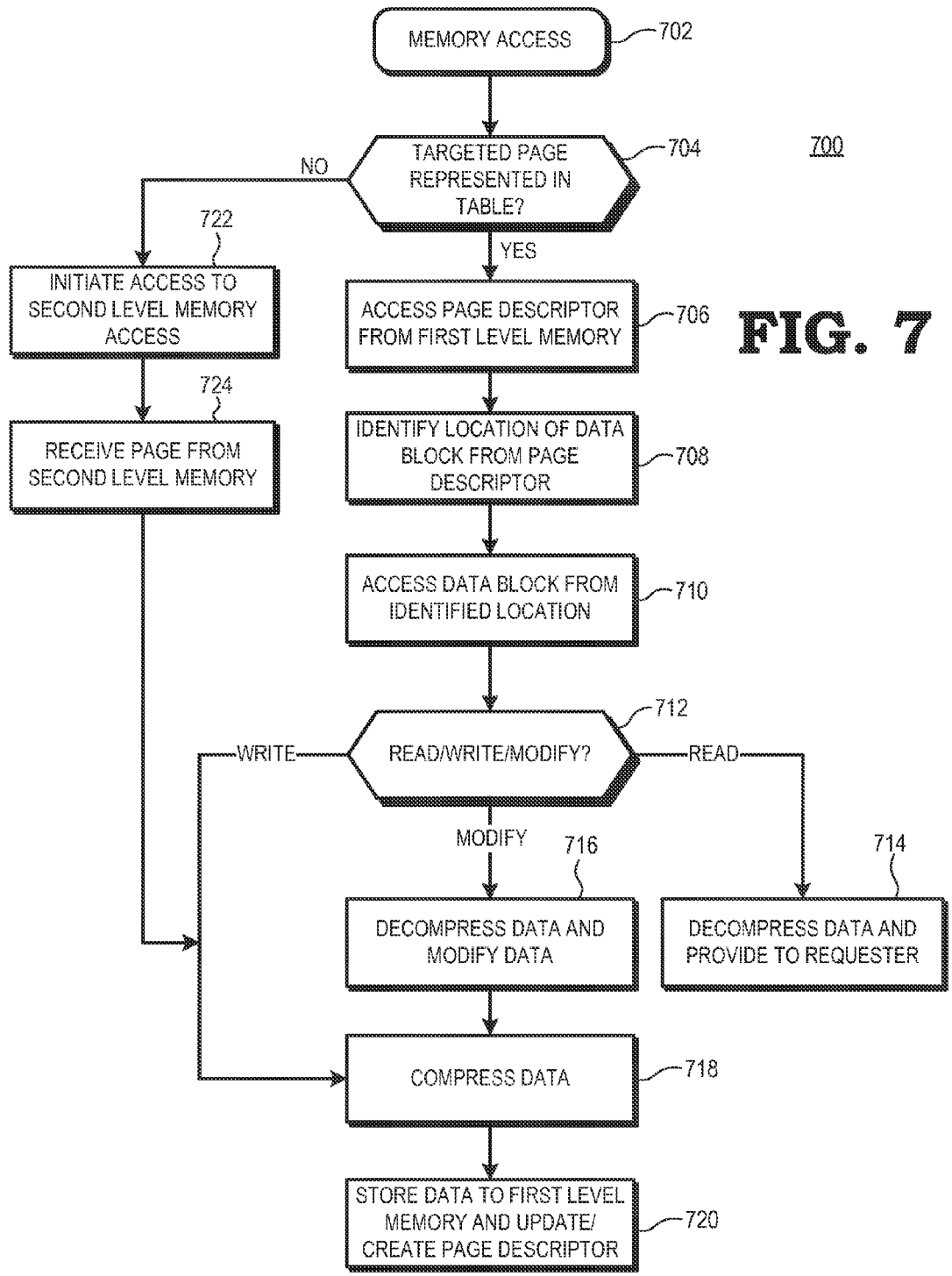
FIG. 7 is a flow diagram illustrating a method for accessing data from a compressed memory page stored at a lower-level memory of a memory hierarchy in accordance with some embodiments.

FIG. 7 illustrates example method 700 for page-based compression in lower-level memory in accordance with some embodiments. For ease of illustration, the method 700 is described in the context of the processing system 100 of FIGS. 1 and 6. The method 700 initiates at block 702 with the issuance of a memory access request to the memory controller 112. The memory access request can represent, for example, a read access (either for providing data to a data consumer or for evicting data to a higher-level memory), a write request, or a modify request. In response to the memory access request, at block 704 the memory controller 112 accesses the page descriptor table 604 stored in the first level memory 106 to determine whether the first level memory 106 is storing a compressed version of the page associated with the requested data. In the event there is a hit (i.e., the first level memory 106 stores the sought-after page), at block 706 the memory controller accesses the page descriptor 606 associated with the sought-after page from the page descriptor table 606, and at block 708 the memory controller 112 identifies the location in the first level memory 106 of the compressed data block within the sought-after page. As noted above, this location can be represented by a pointer in the pointer field 618 of the block entry 612 associated with the compressed data block (identified by, for example, comparing the address values of the block identifier fields 614 of the block entries 612 with the address value of the memory access request).

At block 710, the memory controller 112 uses this pointer to access the compressed data block from the identified location of the first level memory 106. As described above, if the pointer is a null pointer, which signals that the corresponding data block is an all-zero data block, rather than attempt to access the data block, the memory controller 112 instead can generate the data block by producing a data block of zero values. At block 712, the memory controller 112 determines the memory access type (e.g., read, write, modify) of the memory access request and processes the accessed compressed data block accordingly. In the event that the memory access request is a read access, at block 714 the accessed compressed data block can be decompressed by the decompression logic 216 (FIG. 2) and the resulting decompressed data block can be provided to the requester or initiator of the memory access request. Alternatively, if the destination of the requested data is the second level memory 108, the decompression process can be bypassed and the accessed data block can be provided in compressed form.

Returning to block 712, if the memory access request is a modify access, at block 716 the accessed compressed data block is decompressed by the decompression logic 216 (FIG. 2) to generate decompressed data. The decompressed data is then modified in accordance with the modify request to generate modified data to be stored back to the first level memory 106 as write data. At block 718, the compression logic 214 compresses the write data to generate a compressed data block, and at block 720 the memory controller 112 stores this compressed data block to the first level memory 106 and updates the page descriptor table 604 to reflect the introduction of the write data into the compressed page stored in the first level memory 106. This can include, for example, updating or appending a block entry 612 to the page descriptor 606 of the associated page, with the updated/appended block entry 612 including in the pointer field 618 a pointer to the location at which the write data is stored in the first level memory 106. Returning to block 712, if the memory access request is a write access, the write data accompanying the write access is compressed by the compression logic 214 to generate a compressed data block and the compressed data block and its corresponding block entry 612 are stored in the first level memory 106 in accordance with blocks 718 and 720 described above.

Returning to block 704, if the memory controller 112 determines that the requested data is not in the first level memory 106 (i.e., there is a cache miss), at block 722 the memory controller 112 initiates a memory access request to the second level memory 108 to obtain the requested data. The second level memory 108 accesses its memory array to obtain the requested data and provides the requested data to the memory controller 112 as a data block at block 724. The supplied data block is then cached at the first level memory 106 using the same processes described above with respect to a write access.

Figure 8:
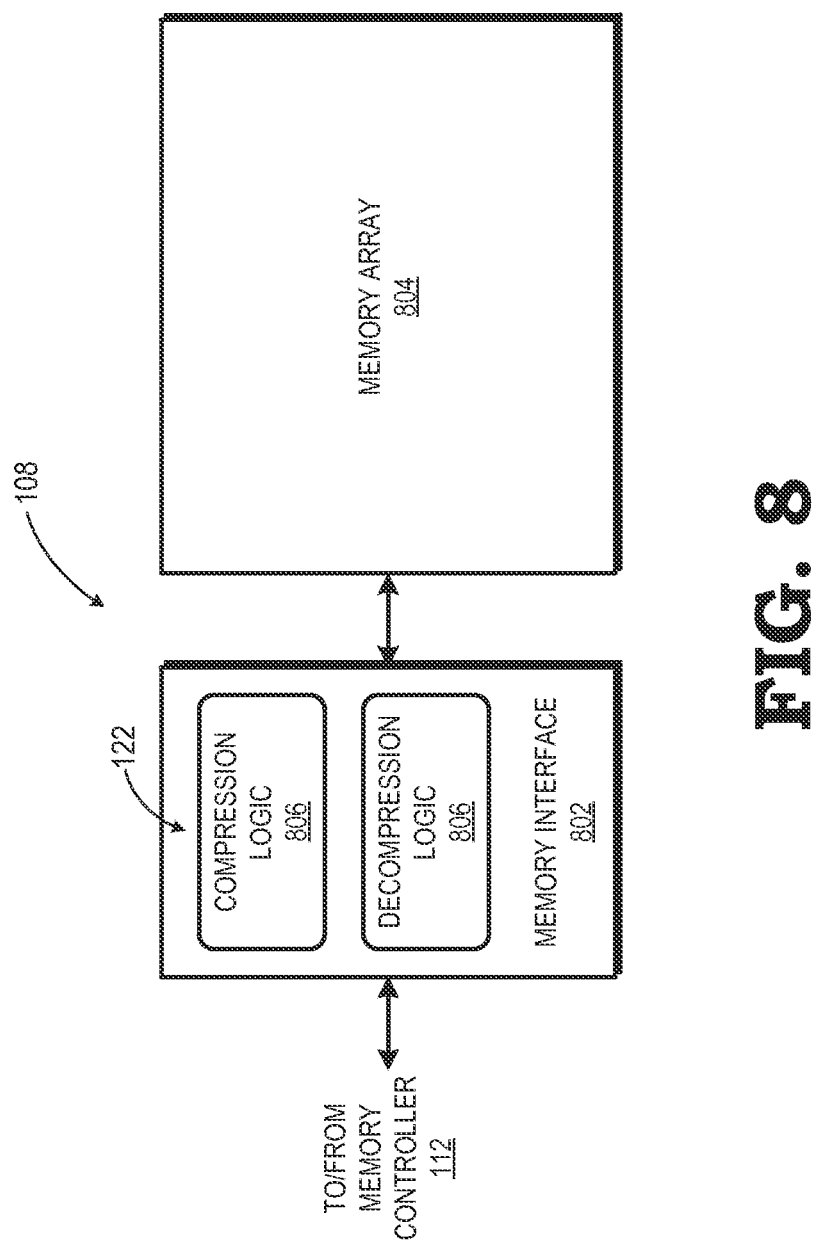
FIG. 8 is a block diagram of a higher-level memory of a memory hierarchy employing compression in accordance with some embodiments.

FIG. 8 illustrates an implementation of the second level memory 108 in accordance with some embodiments. In the depicted example, the second level memory 108 comprises a memory interface 802 and a memory array 804. The memory array 804 may implement any of a variety of memory architectures, as noted above. The memory interface 802 operates to receive and service memory access requests from the memory controller 112 for data stored in, or to be stored in, the memory array 804. To this end, the memory interface 802 can implement the compression/decompression logic 122, which may include compression logic 806 and decompression logic 808. The compression logic 806 may operate to compress data accessed from the memory array 804 and provided to the memory controller 112, thereby reducing the bandwidth necessary to transmit a data block over the interconnect 124 (FIG. 1) connecting the second level memory 108 to the memory controller 112. Moreover, with the data block already compressed in this manner, the memory controller 112 can directly store the compressed data block in the first level memory 106 (either under the row-based compression scheme or the page-based compression scheme) without an additional compression step. Conversely, the memory controller 112 can maintain data blocks transmitted to the second level memory 108 in compressed form to save bandwidth on the interconnect 124. Thus, data evicted from the first level memory 106 need not be decompressed first, but instead can be directly sent to the second level memory 108 in compressed form. Any such compressed data blocks received by the memory interface 802 may be decompressed by the decompression logic 808 before being stored in the memory array 804. Alternatively, the compressed data blocks may be stored directly to the memory array 804 without first being decompressed, although this approach may require an operating system capable of managing a variable-sized memory.

Figure 9:
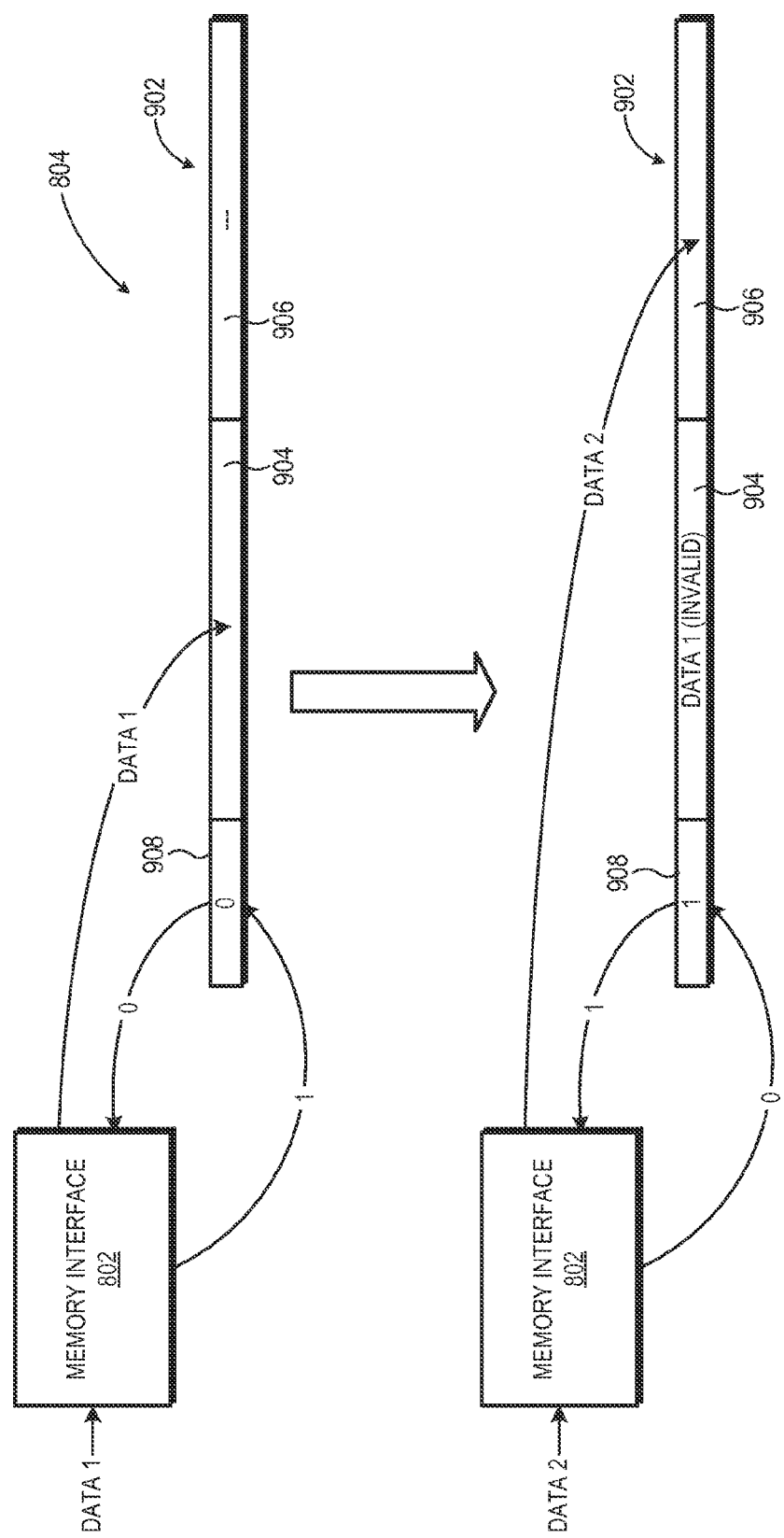
FIG. 9 is a diagram illustrating a wear-leveling technique for storing compressed data blocks at a memory location of a higher-level memory of a memory hierarchy in accordance with some embodiments.

FIG. 9 illustrates an example technique for wear-leveling in the second level memory 108 in accordance with some embodiments. As with the first level memory 106, the second level memory 108 may be implemented as a row-based memory architecture. However, in some instances, the second level memory 108 may be implemented using a memory architecture with limited write endurance. The compression schemes described herein may accelerate the wear-out rate of such memories due to the higher information entropy typically exhibited by compressed data compared to its uncompressed form. Accordingly, in some embodiments, the memory interface 802 can leverage the compression of data blocks afforded by the compression logic 806 (FIG. 8) to provide wear leveling in the memory array 804 of the second level memory 108. In this approach, a data block that would, in uncompressed form, occupy an entire row 902 of the memory array 804 can instead be compressed to generate a compressed data block of a reduced size. This enables the resulting compressed data block to be stored at a variable offset within the row 902, thereby reducing the number of program-erase cycles to any given memory cell within the row 902 over time.

To illustrate, the compression employed by the compression logic 806 of the memory interface 802 may provide a fixed 2:1 compression ratio (i.e., the compression targets the final compressed data size as half the size of the uncompressed data), on a first write of compressed data (denoted "DATA1") to the row 902, the memory interface 802 can write the compressed data to the first half (portion 904) of the row 902, and on the next write of compressed data (denoted "DATA2") to the row 902, the memory interface 802 can write the compressed data to the second half (portion 906) of the row 902. With this approach, any given cell of the row 902 is subjected to a program-erase cycle for only half of the write accesses to the row 902, and thus the row 902 will wear at half the rate of a conventional approach.

Any of a variety of mechanisms may be used by the memory interface 802 to track which offset is to be used for the next write to the row 902. To illustrate, a bit 908 of the error correction code (ECC) bits associated with the row 902 can be used to indicate which half of the row 902 is to receive the next write data, with the memory interface 802 flipping the bit 908 after each write access. In the event that the compression technique yields a different compression ratio, the offset can be managed accordingly. For example, if there is a fixed 3:1 compression ratio, the row 902 instead may be segmented into 3 portions. Moreover, rather than toggle between offsets in the row 902 with each write access, the same offset may be used for a specified number of write accesses in a row, whereby the memory interface 802 uses a counter or other tracking mechanism to count down the number of times an offset is used without change.

In some embodiments, the apparatus and techniques described above are implemented in a system comprising one or more integrated circuit (IC) devices (also referred to as integrated circuit packages or microchips), such as the processor device 102, the IC package 116, the first level memory 106, or the second level memory 108 described above with reference to FIGS. 1-9. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 10:
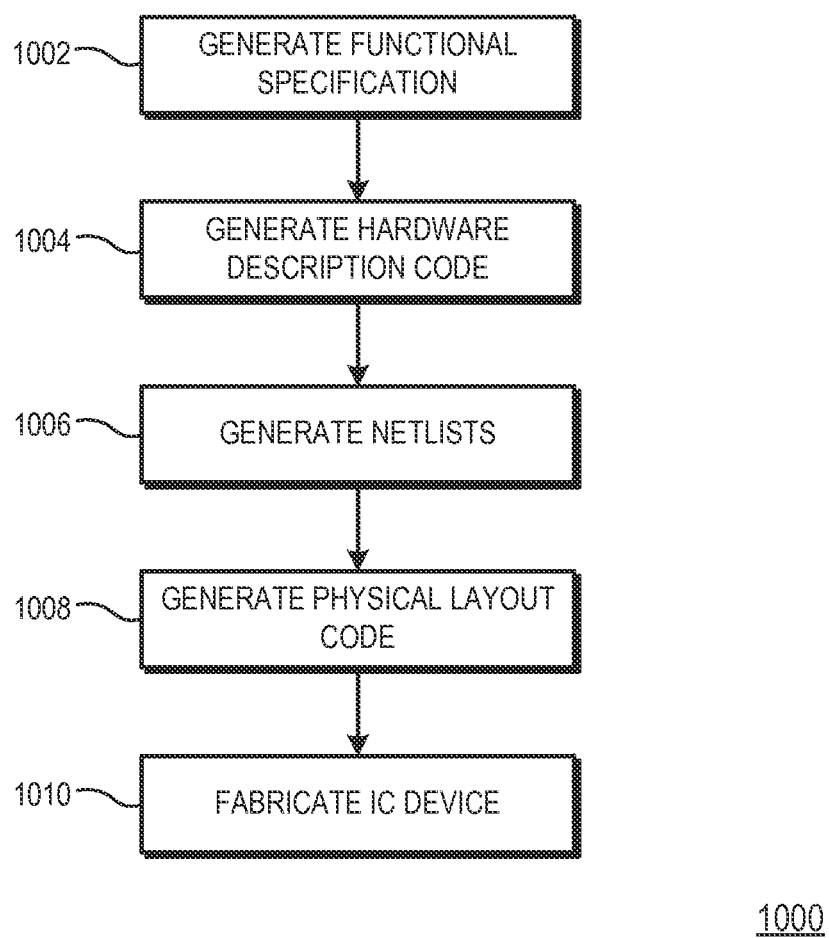
FIG. 10 is a flow diagram illustrating a method for designing and fabricating an integrated circuit device implementing at least a portion of a component of a processing system in accordance with some embodiments.

FIG. 10 is a flow diagram illustrating an example method 1000 for the design and fabrication of an IC device implementing one or more aspects in accordance with some embodiments. As noted above, the code generated for each of the following processes is stored or otherwise embodied in non-transitory computer readable storage media for access and use by the corresponding design tool or fabrication tool.

At block 1002 a functional specification for the IC device is generated. The functional specification (often referred to as a micro architecture specification (MAS)) may be represented by any of a variety of programming languages or modeling languages, including C, C++, SystemC, Simulink, or MATLAB.

At block 1004, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 1006 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 1008, one or more EDA tools use the netlists produced at block 1006 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 1010, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A system comprising:
   a device coupleable to a first memory, the device comprising:
   a second memory to cache data from the first memory, the second memory comprising:
   a plurality of rows, each row comprising a corresponding set of a plurality of compressed data blocks of non-uniform sizes and a corresponding set of a plurality of tag blocks, each tag block representing a corresponding compressed data block of the row and comprising a size indicator and an address value for the corresponding compressed data block;
   control logic to, in response to a memory access request to the device, identify a compressed data block of the set of the plurality of compressed data blocks as storing requested data based on the address values of the set of the plurality of tag blocks of the row, identify a location of the compressed data block in the row based on the size indicators of the tag blocks, and access the identified compressed data block from the identified location; and
decompression logic to decompress data blocks accessed from the second memory.

2. The system of claim 1, wherein the device further comprises:
compression logic to compress data blocks to be stored in the second memory.

3. The system of claim 1, further comprising:
the first memory, wherein the first memory comprises a non-volatile memory; and
wherein the second memory comprises a volatile memory.

4. The system of claim 1, wherein:
the device comprises an integrated circuit (IC) package comprising the second memory and a processor; and
the first memory comprises a memory device external to the IC package.

5. The system of claim 1, wherein:
the memory access request comprises a modify request; and
the control logic further is to modify a decompressed version of the compressed data block based on the modify request to generate a modified data block, compress the modified data block to generate a compressed modified data block, store the compressed modified data block to the row as a compressed data block of the set of the plurality of compressed data blocks, and store a tag block associated with the compressed modified data block to the row as a tag block of the set of the plurality of tag blocks, the stored tag block comprising a size indicator of the compressed modified data block.

6. The system of claim 5 wherein the control logic comprises:
shuffle/compact logic to shuffle a location of at least one other compressed data block in the row to create a space in the row for the compressed modified data block.

7. The system of claim 1, wherein the control logic further is to provide the accessed compressed data block for storage at the first memory.

8. The system of claim 7, further comprising:
the first memory, wherein the first memory comprises:
decompression logic to decompress the accessed compressed data block to generate a decompressed data block for storage at the first memory.

9. The system of claim 8, wherein the first memory further comprises:
compression logic to compress a data block accessed from the first memory prior to transfer of the data block to the device.

10. A method comprising:
storing, at a row of a first memory, a set of a plurality of compressed data blocks of non-uniform sizes and a set of a plurality of tag blocks, each tag block representing a corresponding compressed data block of the row and comprising a size indicator for the corresponding compressed data block and an address value associated with the compressed data block; and
in response to a memory access request:
identifying a compressed data block of the set of the plurality of compressed data blocks as storing requested data based on the address values of the set of the plurality of tag blocks of the row;
identifying a location of the compressed data block in the row based on the size indicators of the tag blocks; and
accessing the compressed data block from the identified location.

11. The method of claim 10, further comprising:
decompressing the accessed compressed data block to generate a decompressed data block.

12. The method of claim 11, further comprising:
providing the decompressed data block for storage at a second memory.

13. The method of claim 10, further comprising:
transmitting the accessed compressed data block to a second memory for storage.

14. The method of claim 13, further comprising:
decompressing, at the second memory, the accessed compressed data block to generate a decompressed data block; and
storing the decompressed data block at a memory array of the second memory.

15. The method of claim 13, further comprising:
determining a current offset for a row of the second memory based on a previous offset used to previously store a compressed data block at the row; and
storing the accessed compressed data block at a location of the row based on the current offset.

16. A non-transitory computer readable storage medium embodying a set of executable instructions, the set of executable instructions to manipulate a computer system to perform a portion of a process to fabricate at least part of a device, the device coupleable to a first memory and comprising:
a second memory to cache data from the first memory, the second memory comprising:
a plurality of rows, each row comprising a corresponding set of a plurality of compressed data blocks of non-uniform sizes and a corresponding set of a plurality of tag blocks, each tag block representing a corresponding compressed data block of the row and comprising a size indicator for the corresponding compressed data block and an address value associated with the compressed data block;
control logic to, in response to a memory access request to the device, identify a compressed data block of the set of the plurality of compressed data blocks as storing requested data based on the address values of the set of the plurality of tag blocks of the row, identify a location of the compressed data block in the row based on the size indicators of the tag blocks, and access the identified compressed data block from the identified location; and
decompression logic to decompress data blocks accessed from the second memory.

17. The non-transitory computer readable storage medium of claim 16, wherein:
the memory access request comprises a modify request; and
the control logic further is to modify a decompressed version of the compressed data block based on the modify request to generate a modified data block, compress the modified data block to generate a compressed modified data block, store the compressed modified data block to the row as a compressed data block of the set of the plurality of compressed data blocks, and store a tag block associated with the compressed modified data block to the row as a tag block of the set of the plurality of tag blocks, the stored tag block comprising a size indicator of the compressed modified data block.

18. The non-transitory computer readable storage medium of claim 17, wherein the control logic further is to provide the accessed compressed data block for storage at the first memory.

19. The non-transitory computer readable storage medium of claim 18, wherein the device further comprises:
   the first memory, wherein the first memory comprises:
      decompression logic to decompress the accessed compressed data block to generate a decompressed data block for storage at the first memory.

20. The non-transitory computer readable storage medium of claim 19, wherein the first memory further comprises:
   compression logic to compress a data block accessed from the first memory prior to transfer of the data block to the device.

\* \* \* \* \*